3,130,159
LUBRICANT FOR WORKING OF METALS
Tore Per Gustav Stedt, Ornstigen 7, Nasbypark, Sweden
No Drawing. Filed May 16, 1960, Ser. No. 29,140
Claims priority, application Sweden May 22, 1959
3 Claims. (Cl. 252—31)

This invention relates to a lubricant for working or shaping metals, such as draw rolling and extrusion and other plastic deformation methods and cutting and turning and other swarf producing methods. The invention is particularly concerned with lubricants for tube reducing and tube rolling, e.g. tube reducing with a pilgrim step rolling mill.

It is known to use a mixture of fatty acids obtained from wool fat and lime dissolved in perchlorethylene or trichlorethylene as a lubricant for extrusion and drawing and as lubricant at reducing with a pilgrim step rolling mill. However, this lubricant shows the disadvantage that it is very difficult to remove particularly owing to lime soaps formed of the fatty acids and the lime being bonded very firmly to the metal surface. This disadvantage causes large expense at the degreasing and if this degreasing is not completely accomplished a cementation of the metal occurs after annealing accompanied by deterioration of the properties of the metal particularly when treating stainless steel.

The lubricant of the invention does not show these disadvantages.

The lubricant of the invention for plastic deformation of metals and for shaping of metals by swarf producing methods particularly for tube reducing and especially for tube reducing with a pilgrim step rolling mill comprises a mixture of (1) esters of polyhydric alcohols and tall oil and (2) esters of polyhydric alcohols and fatty acids from animal and/or vegetable fats and/or fish fats.

The lubricant of the invention is further characterized in that besides the constituents (1) and (2) it contains (3) one or more additives capable of forming a protecting layer on the metal.

The lubricant with three different groups of constituents consists particularly of 5 to 50 percent by weight of the additive (3), 5 to 90 percent by weight of the constituent (1) and 5 to 90 percent by weight of the constituent (2) and preferably of 10 to 30 percent by weight of the additive (3), 15 to 50 percent by weight of the constituent (1) and 15 to 50 percent by weight of the constituent (2).

The polyvalent alcohols are preferably polyalkylene glycols, such as polyethylene glycol or polypropylene glycol and particularly polyethylene glycol with a molecular weight of 500 to 1500.

The tall oil is preferably refined tall oil (so-called tall fatty acid) with a proportion of resin acids of not more than 20 percent by weight.

It is also possible to use tall oil, refined tall oil, or the fatty acids from wool fat in the form of polymerized or polycondensed products.

The tall oil being the constituent of the lowest price is used in the form of esters as the largest constituent in the lubricant. The esters of tall oil and the alcohols act as dispergators of the large quantities of unsaponifiable material usually contained in the fatty acid esters. Thus the wool fatty acids have a proportion of unsaponifiable material of 16 to 24 percent by weight. The proportion of unsaponifiable material in tall oil is only about 3 to 4 percent by weight. The unsaponifiable material must be completely dispersed to make an effective lubrication possible.

The fatty acid contained in the esters of the lubricant of the invention may also be separate pure fatty acids, e.g. lauric, myristic, palmitic, stearic, arachidic, and other saturated acids, or oleic, elaidic, linolic, linoleic acid and other unsaturated acids or mixtures thereof. However, mixtures or refined mixtures of fatty acids obtained from natural products are used, e.g. lard, tallow bees-wax, wool fat, lanolin and other animal fats. The vegetable fats serving as raw material in producing the lubricant of the invention ordinarily have a low proportion of unsaponifiable substances and are by way of example olive oil, sesame oil, soya oil, cotton seed oil, palm oil, coconut oil and other vegetable fats. Particularly rape seed oil is used. The resin acids contained in the tall oil could be replenished by pure abietic acid or colophony.

The polyvalent alcohols may also be glycols, glycerols, tetritols or pentitols and hexitols. Thus, it is possible to use ethylene glycol, diethylene glycol, triethylene glycol and polyethylene glycols set forth above and the corresponding propylene glycols, polyvalent glycerines, pentaerythritol, sorbitol, trimethoxypropane and other compounds.

To produce a protective layer on the metal the lubricant suitably is mixed with an additive being tied to the metal.

The additive consists of one or more members from the group consisting of additives containing chlorine, e.g. chlorinated paraffines, pentachlorphenol, additives containing sulfur, e.g. sulfur, sulfurchloride, sulfur oxychloride, organic sulfur compounds, e.g. dialkyl sulfides, such as diethyl sulfide, oxyalkyl sulfides, such as dioxyethyl sulfide, mercaptobenzothiazole, sodium mercaptobenzothiazole, additives containing phosphorus, e.g. tricresyl phosphate.

The lubricant according to the invention may also in addition contain lubricants known per se, e.g. mineral oil lubricants, synthetic lubricants.

Tests have proved that pure esters of fatty acids from wool fat do not produce the effect desired even if the additives mentioned above are added thereto. In this case the fact is that difficulties arise to completely remove the lubricant remaining on the metal. However, by using the lubricant of the invention, e.g. a mixture of fatty acid esters and tall oil esters, this difficulty is removed largely depending on the fact that the tall fatty acid esters act as dispersing agents of the large quantities of unsaponifiable substances contained in most animal fats. Otherwise these unsaponifiable substances precipitate and attach to the metal, said substances being difficult to remove from the metal. The tall oil esters also act as dispersing agents for the additives in the lubricant.

Three lubricant compositions and tests on a pilgrim step rolling mill are set forth below, the estimate figure after the treatment of the metal being given as a gradation from 0 to 10 with 0 worst and 10 best concerning the surface levelness. The surface levelness is estimated inside as well as outside of the tube. Particularly the inside surface levelness is of great importance for tubes intended for the food stuff and pharmaceutical industries.

| Lubricant | Composition | Percent by weight | Estimation | |
|---|---|---|---|---|
| | | | Outside | Inside |
| 1 | Ester of tall fatty acid and polyethylene glycol | 100 | 5 | 5 |
| 2 | Ester of tall fatty acid and polyethylene glycol | 90 | | |
| | Tricresyl phosphate | 10 | 7 | 7 |
| 3 | Ester of tall fatty acid and polyethylene glycol | 80 | | |
| | Ester of wool fatty acid and polyethylene glycol | 10 | 10 | 10 |
| | Tricresyl phosphate | 10 | | |
| 4 | Mixture of wool fat and lime | | 2 | 1 |

The tests above indicate that the lubricant according to the invention is superior to lubricant known per se concerning the surface levelness of the metal after rolling in a pilgrim step rolling mill and the after-treatment of the metal.

The table below presents a comparison of tube rolling tests on a pilgrim step rolling mill using lubricants consisting of constituent (1) ester of tall fatty acid and polyethylene glycol, constituent (1) and constituent (2) ester of wool fatty acid and polyethylene glycol, and constituents (1)÷(3) additives containing chlorine or chlorine and sulfur.

2. The lubricant composition defined in claim 1, wherein component "1" is from 15 to 50 percent by weight, component "2" is from 50 to 15 percent by weight, and component "3" is from 10 to 30 percent by weight of said composition.

3. The lubricant composition defined in claim 1, wherein component "2" consists essentially of esters of polyethylene glycol and wool fatty acids, component "3" consists essentially of chlorinated paraffine containing about 42% of chlorine, and the three components are

| Test | 1 | 2 | 3 | 4 | 5 | 6 | 7 |
|---|---|---|---|---|---|---|---|
| Lubricant | Ester of tall fatty acid and polyethylene glycol. | 80% ester of tall fatty acid and polyethylene glycol, 20% ester of wool fatty acid and polyethylene glycol. | 20% ester of tall fatty acid and polyethylene glycol, 80% ester of wool fatty acid and polyethylene glycol. | 80% ester of tall fatty acid and polyethylene glycol, 20% lime. | 64% ester of tall fatty acid and polyethylene glycol, 16% ester of wool fatty acid and polyethylene glycol, 20% lime. | 64% ester of tall fatty acid and polyethylene glycol, 16% ester of wool fatty acid and polyethylene glycol, 20% Cerechlor 42 (chlorinated paraffin with 42% chlorine). | 64% ester of tall fatty acid and polyethylene glycol, 16% ester of wool fatty acid and polyethylene glycol, 15% Cerechlor 42, 5% mercaptobenzothiazole. |
|  | Result | Result | Result | Result | Result | Result | Result |
| Working step: Step rolling of stainless tubes. Material: SIS 2320. Analysis: C, 0.08%; Cr, 17%. Reducing: 60%. Dimensions: 2½ inches; 3½ inches. | The mandrel as well as the chuck were hardfaced (welded). | The mandrel as well as the chuck were hardfaced but less than at test No. 1. | Same result as at test No. 2. | Mandrel and chuck were hardfaced, the lime produced a worse surface. Lime and other constituents might be incorporated in the surface layer. | The mandrel was sometimes hardfaced but not the chuck. Lime caused worse surface. Lime and other constituents might be incorporated in the surface layer. | Not necessary with lubricant carrier such as lime. No scratching. | With larger dimensions small scratching. This disappeared after adding an additive containing sulfur. |
| Feeding | Very uneven | More even than at test No. 1. | More even than at test No. 1. | Very uneven feeding. | Even feeding | Even feeding | Even feeding. |
| 80 steps/minute, 7 mm./step | 7 mm./10 steps | 7 mm./2 steps | 7 mm./2 steps | 7 mm./6 step (Lime caused difficult degreasing) | 7 mm./step (Lime caused difficult degreasing) | 7 mm./step (Very easy to degrease) | 7 mm./step. (Very easy to degrease) |
| Cementation tests |  |  |  |  |  | No cementation. Chlorides could not be proved. | No cementation. Chlorides could not be proved. |
| Corrosion: The surface layer was dissolved in boiling nitric acid (Qualitative analysis of chlorine). |  |  |  |  |  |  |  |
| Surface levelness/profile depth | Strong scratching. | 4 my | 4 my | Strong scratching. | 6 my | 2 my | 2 my. |
| Outside surface |  | 2 my | 2 my |  | 3 my | 0.8 my | 0.8 my. |

The figures of the surface levelness indicate that good results only are obtained with a lubricant containing the constituents 1÷2÷3.

What I claim is:

1. A lubricant composition for plastic deformation of metals and for shaping of metals by swarf producing methods, particularly for tube reducing and especially for tube reducing with a pilgrim step rolling mill, said composition consisting essentially of a mixture of (1) 5 to 90 percent by weight of esters of polyethylene glycol with a molecular weight of from 500 to 1500 and tall oil, and (2) 90 to 5 percent by weight of esters of polyethylene glycol with a molecular weight of 500 to 1500 and fatty acids selected from the group consisting of wool fatty acids, rape seed oil fatty acids, lanolin fatty acids, lard fatty acids, tallow fatty acids, bees wax acids, olive oil fatty acids, sesame oil fatty acids, cotton seed oil fatty acids, and (3) 5 to 50 percent by weight of an additive selected from the group consisting of chlorinated paraffines containing about 42% chlorine, pentachlor-phenol, sulfur, sulfur chloride, sulfur oxychloride, diethylsulfide, dioxyethyl sulfide, mercaptobenzothiazole, sodium mercaptobenzothiazole and tricresyl phosphate.

present in the composition in the following relative amounts by weight:

| | Percent |
|---|---|
| Component "1" | About 64 |
| Component "2" | About 16 |
| Component "3" | About 20 |

References Cited in the file of this patent

UNITED STATES PATENTS

| | | |
|---|---|---|
| Re. 23,671 | Cyphers | Feb. 6, 1951 |
| 2,157,873 | Van Peski et al. | May 9, 1939 |
| 2,590,451 | Perry | Mar. 25, 1952 |
| 2,599,353 | Showalter | June 3, 1952 |
| 2,627,514 | Kirkpatrick | Feb. 3, 1953 |
| 2,968,999 | Breton | June 24, 1961 |

FOREIGN PATENTS

| | | |
|---|---|---|
| 488,390 | Great Britain | July 6, 1938 |

OTHER REFERENCES

"Carbowax Compounds and Polyethylene Glycols," pub. by Carbide and Carbon Chemicals Corp., N.Y., N.Y., June 30, 1946, page 4.